(12) United States Patent
Barendrecht et al.

(10) Patent No.: US 12,504,202 B2
(45) Date of Patent: Dec. 23, 2025

(54) DEVICE FOR PRODUCING HOT LIQUID

(71) Applicant: SOCIETE COMMERCIALE ET D'ENGINEERING, Les Herbiers (FR)

(72) Inventors: Nathalie Barendrecht, Les Sables D'Olonne (FR); Aurélien Salles, Cholet (FR)

(73) Assignee: SOCIETE COMMERCIALE ET D'ENGINEERING, Les Herbiers (FR)

( * ) Notice: Subject to any disclaimer, the term of this patent is extended or adjusted under 35 U.S.C. 154(b) by 852 days.

(21) Appl. No.: 17/779,353

(22) PCT Filed: Nov. 25, 2020

(86) PCT No.: PCT/FR2020/052168
§ 371 (c)(1),
(2) Date: May 24, 2022

(87) PCT Pub. No.: WO2021/105610
PCT Pub. Date: Jun. 3, 2021

(65) Prior Publication Data
US 2022/0404065 A1     Dec. 22, 2022

(30) Foreign Application Priority Data

Nov. 29, 2019   (FR) ...................................... 1913514
Nov. 29, 2019   (FR) ...................................... 1913518

(51) Int. Cl.
*F24H 1/20* (2022.01)
*F24H 1/18* (2022.01)
*F24H 9/1818* (2022.01)

(52) U.S. Cl.
CPC ............. *F24H 1/202* (2013.01); *F24H 1/181* (2013.01); *F24H 9/1818* (2013.01)

(58) Field of Classification Search
None
See application file for complete search history.

(56) References Cited

U.S. PATENT DOCUMENTS 4,498,622 A * 2/1985 Harnish .............. F24D 19/1054
126/362.1
4,540,874 A * 9/1985 Shaffer, Jr. ............ F24H 15/223
392/308

(Continued)

FOREIGN PATENT DOCUMENTS

AU         417804      10/1971
DE         4035115      9/1991
(Continued)

OTHER PUBLICATIONS

International Search Report dated Feb. 8, 2021.
Search Report dated Jul. 14, 2020.

*Primary Examiner* — Thor S Campbell
(74) *Attorney, Agent, or Firm* — IPSILON USA, LLP (57) ABSTRACT

Device (1) for producing hot liquid, comprising: —a tank (2) of liquid, —a system (6) for heating the contents of the tank (2), —a heat exchanger (7) comprising a primary circuit (8) equipped with a fluid inlet (8A) and a fluid outlet (8B), a secondary circuit (9) equipped with a fluid inlet (9A) and a fluid outlet (9B) and a region (10) for exchanging heat energy between the primary circuit (8) and the secondary circuit (9), —a circuit (11) for circulation in a loop between the tank (2) and the primary circuit (8) of the heat exchanger (7), and—a pump (12) arranged on the circuit (11) for circulation in a loop. The device (1) comprises a valve (31) arranged on the circuit (11) for circulation in a loop between the tank (2) and the primary circuit (8) of the heat exchanger (7), a member (32) for moving the valve (31) between an open position and a closed position, a control unit (17) for controlling at least the pump (12) and the member (32) for moving the valve (31).

14 Claims, 10 Drawing Sheets

(56) References Cited

U.S. PATENT DOCUMENTS

| | | | | |
|---|---|---|---|---|
| 4,543,468 | A * | 9/1985 | Shaffer, Jr. | F24D 19/1054 |
| | | | | 62/238.7 |
| 5,020,721 | A * | 6/1991 | Horne | F24H 1/186 |
| | | | | 122/18.4 |
| 5,255,338 | A * | 10/1993 | Robinson, Jr. | F24D 19/1054 |
| | | | | 219/510 |
| 5,367,602 | A * | 11/1994 | Stewart | F24D 19/1054 |
| | | | | 392/308 |
| 5,921,207 | A * | 7/1999 | DiSalvo | F24H 9/0042 |
| | | | | 122/19.1 |
| 7,040,108 | B1 * | 5/2006 | Flammang | F24D 11/0214 |
| | | | | 62/238.6 |
| 9,063,551 | B2 * | 6/2015 | Deivasigamani | F24H 15/395 |
| 2014/0209043 | A1 * | 7/2014 | Hardesty | F24H 15/225 |
| | | | | 220/694.1 |
| 2019/0338962 | A1 * | 11/2019 | Minnoy | F24D 17/02 |
| 2024/0044549 | A1 * | 2/2024 | Konowalczyk | F24D 17/0026 |
| 2024/0093910 | A1 * | 3/2024 | Konowalczyk | F24H 7/04 |

FOREIGN PATENT DOCUMENTS

| | | | | |
|---|---|---|---|---|
| DE | 4206074 | | 9/1993 | |
| DE | 4206074 | A1 * | 9/1993 | F24D 17/0078 |
| DE | 102016206906 | A1 * | 10/2017 | F22D 5/30 |
| WO | 2009077966 | | 6/2009 | |

* cited by examiner

DEVICE FOR PRODUCING HOT LIQUID

RELATED APPLICATION

This application is a National Phase of PCT/FR2020/052168 filed on Nov. 25, 2020, which claims the benefit of priority from French Patent Application Nos. 19 13514, filed on Nov. 29, 2019 and 19 13518 also filed on Nov. 29, 2019, the entirety of which are incorporated by reference.

FIELD OF THE INVENTION

The present invention relates to a device for producing hot fluid, in particular domestic hot water.

It relates more particularly to a device for producing hot fluid, comprising:
- a tank for receiving liquid, equipped with at least one fluid inlet and one fluid outlet, at least the part of the tank called the inner part, suitable for being in contact with the liquid filling the tank, being made of synthetic material,
- a system for heating the contents of the tank,
- a heat exchanger comprising a primary circuit equipped at least with a fluid inlet and a fluid outlet, a secondary circuit equipped at least with a fluid inlet and a fluid outlet, and a zone, for heat exchange between the primary and secondary circuits, which is arranged outside the tank,
- a loop circulation circuit between the tank and the primary circuit of the heat exchanger, and
- a pump arranged on the loop circulation circuit, the inlet of the secondary circuit of the heat exchanger being connectable to a source of fluid to be heated in order to allow the production of hot fluid at the outlet of the secondary circuit.

DESCRIPTION OF RELATED ART

Such a device for producing hot fluid, in particular in the case of application to domestic hot water, is known. However, the design of current devices is not entirely satisfactory in terms of the longevity, maintenance and efficiency of the device. In particular, the amount of hot water that can be produced is generally found to be small in relation to the amount of water that is stored. Likewise, the control of the temperature of the fluid to be heated at the start of the draw-off is often imperfect.

OBJECTS AND SUMMARY

An object of the invention is to make available a device for producing hot fluid, the design of which device makes it possible, for a tank volume equal to that of a tank of a prior art device for producing hot fluid, to optimize the amount of hot fluid produced in relation to the amount of liquid stored in the tank, without adversely affecting the quality of the control of the temperature of the fluid to be heated at the start of the draw-off.

To this end, the subject of the invention is a device for producing hot fluid, in particular domestic hot water, comprising:
- a tank for receiving liquid, equipped with at least one fluid inlet and one fluid outlet, at least the part of the tank called the inner part, suitable for being in contact with the liquid filling the tank, being made of synthetic material,
- a system for heating the contents of the tank,
- a heat exchanger comprising a primary circuit equipped at least with a fluid inlet and a fluid outlet, a secondary circuit equipped at least with a fluid inlet and a fluid outlet, and a zone, for heat exchange between the primary and secondary circuits, which is arranged outside the tank,
- a loop circulation circuit between the tank and the primary circuit of the heat exchanger, and
- a pump arranged on the loop circulation circuit, the inlet of the secondary circuit of the heat exchanger being connectable to a source of fluid to be heated in order to allow the production of hot fluid at the outlet of the secondary circuit, characterized in that the device comprises a valve arranged on the loop circulation circuit between the tank and the primary circuit of the heat exchanger, a drive member for moving the valve between an open position and a closed position, a unit for controlling at least the pump and the drive member for moving the valve, the control unit being configured to control the actuation of the drive member for moving the valve and thus the passage of the valve from the open position to the closed position, or vice versa, depending on the on/off state of the pump.

The position of the heat exchange zone of the heat exchanger outside the tank makes it possible to free up the useful space of the tank in order to store liquid therein, and the fact that the part of the tank in contact with the liquid is made of synthetic material makes it possible to increase the heating temperature of said liquid, these two features contributing to optimization of the amount of hot fluid produced in relation to the amount of liquid stored in the tank, without adversely affecting the longevity of the device or its ease of maintenance. The design of the device can make it possible to dispense with a thermostatic mixer at the point of use of the hot fluid.

In addition, the presence of a controlled valve on the loop circulation circuit between the tank and the primary circuit of the heat exchanger makes it possible to perfectly control the thermosiphon phenomena.

According to one embodiment of the invention, the device comprises a clock, and the control unit is configured to control the actuation of the drive member for moving the valve in the sense of opening the valve in parallel with the control of the start-up of the pump and is configured to control the actuation of the drive member for moving the valve in the sense of closing the valve in the stopped state of the pump, after the pump has been stopped for a predetermined period of time.

This piloted, in particular motorized, valve makes it possible to firstly authorize a thermosiphon and then stop this phenomenon in order to keep the heat exchanger as cold as possible, so as to make the temperature of the fluid to be heated more reliable at the start of the draw-off.

According to one embodiment of the invention, the pump is a pump with a variable flow rate, and the device comprises means for regulating the flow rate of said pump, these means for regulating the flow rate of the pump comprising a flowmeter preferably arranged at the inlet of the secondary circuit, and at least two temperature probes, at least one of which is arranged on the loop circulation circuit between the tank and the primary circuit of the heat exchanger, and the control unit is configured to control the pump at least according to the data supplied by the temperature probes and the flowmeter.

The presence of a pump with an adjustable flow rate makes it possible to comply with the desired temperature setpoint of hot liquid.

The regulating means make it possible to offer very good reactivity and instantaneous production of hot water at a temperature close to the desired setpoint temperature. Although the flowmeter can be at another location, the presence of the flowmeter at the inlet of the secondary circuit can make it possible to control the operation of the pump only when a flow is detected, which limits wear of the pump and limits the power consumption of the device.

According to one embodiment of the invention, the device comprises, at the inlet of the secondary circuit, in the zone of connection of the inlet of the secondary circuit to at least one source of fluid to be heated, a duct arranged at least partially in the thickness of the tank, this duct, called the inlet duct, being able to be coupled at one end to the inlet of the secondary circuit of the heat exchanger and dividing, at the end opposite the connection to at least one source of fluid to be heated, into two branches which are equipped one with a closure member and the other with a flowmeter.

This arrangement makes it possible to supply the heat exchanger with cold fluid from the network of fluid to be heated, or with hot fluid coming from a hot fluid distribution network in order to permit immediate output of hot fluid during a draw-off.

According to one embodiment of the invention, the loop circulation circuit between the tank and the primary circuit of the heat exchanger comprises an outward branch arranged between the outlet of the tank and the inlet of the primary circuit, and a return branch arranged between the outlet of the primary circuit and the inlet of the tank, the pump and the valve being preferably arranged on the outward branch of the loop circulation circuit.

According to one embodiment of the invention, the tank is equipped with an orifice for filling the tank with liquid, this filling orifice being connected by a closable fluidic connection to the portion of the secondary circuit extending between the inlet of the secondary circuit and the zone for heat exchange between the primary and secondary circuits of the heat exchanger.

Preferably, the closable fluidic connection is provided, at the level of the filling orifice, with a part for connection to the tank, this connection part being provided with a vent, an overflow orifice, and an additional orifice acting as an overflow or vent depending on the filling level of the tank. This arrangement makes it possible to safely avoid mixing "dead" water, contained in the tank, with the liquid for filling the tank, coming from a network.

Preferably, the part for connection to the tank, being part of the closable fluidic connection at the level of the filling orifice, is provided with a closure member mounted movably between a closed position and an open position and returned, under the effect of its own weight, to the closed position. Preferably, this closure member is a pivoting valve. The presence of such a closure member at this level makes it possible to avoid the formation of condensation at the lid of the casing.

According to one embodiment of the invention, the tank is equipped with a lower level sensor and an upper level sensor, which are arranged at different heights in the tank, the closable fluidic connection is provided with a closure member equipped with an electrical control circuit, and the electrical control circuit is configured to pass from the closed state, corresponding to the open position of the closure member, to the open state, corresponding to the closed position of the closure member at least in the activated state of the upper level sensor. By virtue of this configuration, the risks of the tank overflowing are reduced.

According to one embodiment of the invention, the outlet of the tank, connectable to the inlet of the primary circuit, is arranged in the upper third of the internal volume of the tank, and the inlet of the tank, connectable to the outlet of the primary circuit, is arranged in the lower third of the internal volume of the tank. By virtue of this arrangement of the inlet and outlet of the tank, the temperature stratification, also called the thermal stratification, of the liquid inside the tank is maintained. This permits better control of the temperature of the liquid leaving the tank.

According to one embodiment of the invention, at least part of the heating system is housed in the tank, and the inlet of the tank, connectable to the outlet of the primary circuit of the heat exchanger, opens into the tank at a level lower than the level occupied by the part of the heating system housed in the tank. Again, this arrangement makes it possible to maintain the temperature stratification of the liquid inside the tank.

According to one embodiment of the invention, the tank comprises, in the lower half of the tank, on the outer surface of the tank, a reservation inside which the heat exchanger, which is a counter-current exchanger, preferably with plates, is able to be housed in order to extend at least partially within the overall contour of the tank. This positioning of the heat exchanger in the lower part of the tank offers an advantage in terms of the thermosiphon of the heat exchanger and in terms of maintaining the thermal stratification of the liquid contained in the tank.

In addition, this arrangement permits savings in terms of thermal insulation of the ducts of the various circuits.

According to one embodiment of the invention, the heat exchanger, when connected to the tank, is arranged at a level lower than the level occupied by the inlet of the tank connectable to the outlet of the primary circuit of said heat exchanger. This arrangement permits emptying by thermosiphon of the hot liquid that may be contained in the primary circuit of the heat exchanger, which makes it possible to better control the temperature of the fluid to be heated at the start of the draw-off. Indeed, it has been observed that if hot liquid stagnated in the primary circuit of the heat exchanger, it disrupted the control of the temperature of the fluid to be heated at the start of the draw-off. Finally, some of the hot liquid stagnating in the outward branch of the loop circuit between tank and heat exchanger can be reintroduced into the tank in order to be used during the next draw-off.

According to one embodiment of the invention, the tank comprises an enclosure, a casing at least partially surrounding the enclosure, and an insulator arranged between the enclosure and the casing.

According to one embodiment of the invention, at least part of the heating system is housed in the tank, and the thickness of the tank, taken between the outer face of the casing and the inner face of the enclosure, is, in the part of the tank extending above the part of the heating system housed inside the tank, at least locally greater than the thickness of the tank extending below the part of the heating system housed inside the tank. The reinforcement of the insulation in the upper part of the tank makes it possible to keep the upper part of the tank as hot as possible.

According to one embodiment of the invention, at least the heat exchanger, the pump, which has a variable flow rate, and the valve, with its drive member for moving it, which is preferably a motor, form a ready-to-install assembly. This results in easier maintenance and manufacture.

According to one embodiment of the invention, the heating system comprises at least one electrical resistance housed inside the tank, the tank comprises, at the level of the, or at least one of the, electrical resistance(s), two mutually opposite orifices formed one in the enclosure and the other in the casing, these orifices being connected by a housing body with a drilled bottom forming a connecting sleeve between said orifices, this housing body extending at least partially inside the enclosure, and the electrical resistance is in the form of an elongate body provided with a seal engaged on the electrical resistance, this seal, in leaktight contact with the electrical resistance, sealingly closing the bore at the bottom of the housing body in the state with the electrical resistance extending through said bore.

BRIEF DESCRIPTION OF THE DRAWINGS

The invention will be clearly understood on reading the following description of exemplary embodiments, with reference being made to the appended drawings, in which.

DETAILED DESCRIPTION

As has been mentioned above, the subject of the invention is a device 1 for producing hot fluid, in particular hot liquid. In the example described below, the device 1 is a device for producing hot water, preferably domestic hot water, for instantaneous production of hot water, but such a device can be applied to the production of other types of hot liquids depending on the source of liquid to be heated, without departing from the scope of the invention.

This device for producing hot liquid can be a device for producing domestic hot water, suitable for installation in any type of building.

The device 1 for producing hot water thus comprises:
a tank 2 for receiving liquid, equipped with at least one fluid inlet 3 and one fluid outlet 4,
a system 6 for heating the contents of the tank 2,
a heat exchanger 7 comprising a primary circuit 8 equipped at least with a fluid inlet 8A and a fluid outlet 8B, a secondary circuit 9 equipped at least with a fluid inlet 9A and a fluid outlet 9B, and a zone 10 for heat exchange between the primary 8 and secondary 9 circuits,
a loop circulation circuit 11 between the tank 2 and the primary circuit 8 of the heat exchanger 7, and
a pump 12 arranged on the loop circulation circuit 11, the inlet 9A of the secondary circuit 9 of the heat exchanger 7 being connectable at least to a source of domestic water in order to allow the production of domestic hot water at the outlet of the secondary circuit 9,
a valve 31 arranged on the loop circulation circuit 11 between the tank 2 and the primary circuit 8 of the heat exchanger 7,
a drive member 32, such as a motor, for moving the valve 31 between an open position and a closed position,
and a unit 17 for controlling at least the pump 12 and the drive member 32 for moving the valve 31. This control unit 17 is configured to control the actuation of the drive member 32 for moving the valve 31 in the sense of opening or closing the valve 31, depending on the on/off state of the pump 12.

The liquid contained in the tank 2 is therefore heated in order to supply the primary circuit 8 of the heat exchanger before returning to the tank. For its part, the cold water from the building's domestic water circuit, which is a pressurized water circuit, feeds the secondary circuit 9 of the heat exchanger 7.

This domestic cold water heats up at the level of the heat exchanger 7 by exchange of heat energy with the primary circuit 8 of said exchanger, before being distributed to any one of the water supply points of the building.

As a result of this operation, the liquid contained in the tank is said to be dead. Indeed, this liquid is not intended to be distributed but simply to heat the cold water of the domestic water network.

In this device 1 for producing hot water, the tank 2 for receiving liquid, which can be water or an aqueous solution, or any other type of liquid, is a tank with a vertical axis. In fact, this tank 2 has a bottom face, for support on the ground, and a top face, the longitudinal axis of the tank 2 passing through said faces. In the example shown, the tank is of generally parallelepipedal shape.

At least the part called the inner part of the tank 2, suitable for being in contact with the liquid filling the tank 2, is made of synthetic material, in particular of polyolefin, such as a polypropylene. This tank 2 stores the liquid at atmospheric pressure. At least one safety vent 36, which will be described in more detail below, can be provided in order to prevent any overpressure inside the tank 2.

To avoid heat loss, the tank 2 comprises an enclosure 51, a casing 52 at least partially surrounding the enclosure 51, and an insulator 53 arranged between the enclosure 51 and the casing 52. The liquid is contained inside the enclosure 51. The enclosure 51 is thus equipped with the liquid inlet 3 and liquid outlet 4, with the liquid outlet 4 arranged at a level higher than the level occupied by the liquid inlet 3 of the tank. This enclosure 51 is made of synthetic material, preferably of polyolefin.

The casing 52 is here formed by a body open at the top and by a cover for closing the body. The enclosure 51 is thus inserted into the casing 52 which, in the closed state, completely surrounds the enclosure 51.

For its part, the insulator 53 is formed by a foam, for example, injected into the casing, in the state of the enclosure inserted in the casing 52, in the space left free between the outside of the enclosure 51 and the inside of the casing 52.

The tank 2 comprises, in the lower half of the tank 2, on the outer surface of the tank 2, a reservation 16 inside which the heat exchanger 7 is able to be housed in order to extend at least partially within the overall contour of tank 2. This reservation 16 is formed by a set-back of said tank 2 formed in the side wall of the tank, at the level of the zone of the side wall of the tank adjacent to the bottom of the tank. This reservation thus forms a housing for the heat exchanger outside the tank, which housing can be closed by a cover. The heat exchanger 7 is thus arranged outside the tank at the lower part of the tank 2, that is to say at the lower half of the tank 2, near the bottom of the tank.

In the state when connected to the tank 2, this heat exchanger 7 is arranged at a level lower than the level occupied by the inlet 3 of the tank 2, which is connectable to the outlet 8B of the primary circuit 8 of said heat exchanger 7.

In the examples shown, the heat exchanger 7 is a counter-current exchanger, in particular with plates, and the plates extend horizontally, that is to say substantially parallel to the face forming the tank bottom supported on the floor.

In the example shown, the inlets and outlets of the primary and secondary circuits of the heat exchanger are provided on the same face of the block containing the plates of the exchanger 7.

To allow circulation in a loop between the tank 2 and the primary circuit 8 of the heat exchanger 7, the loop circulation circuit 11 between the tank 2 and the primary circuit 8 of the heat exchanger 7 comprises an outward branch 11A arranged between the outlet 4 of the tank 2 and the inlet 8A of the primary circuit 8, and a return branch 11B arranged between the outlet 8B of the primary circuit 8 and the inlet 3 of the tank, the pump 12 and the valve 31 here being arranged on the outward branch 11A of the loop circulation circuit 11, which is a preferred solution, although the pump 12 and the valve 31 can also be arranged on the return branch.

The outward branch 11A is formed by a duct, of which one end is fixed permanently to the inlet 3 of the tank 2. This duct has a duct length embedded in the insulator of the tank, followed by a duct length which extends in the reservation 16 of the tank 2 in order to be connected to the inlet 8A of the primary circuit 8 of the heat exchanger 7.

The liquid circulates in the primary circuit 8 of the heat exchanger before leaving the heat exchanger at the outlet 8B of the heat exchanger. Again, a duct connects this outlet 8B of the heat exchanger to the inlet 3 of the enclosure of the tank and forms the return branch 11B of the circuit 11.

This connection between the inlet 3 of the tank and the outlet 8B of the primary circuit of the exchanger is of a shorter length than the connection between the outlet 4 of the tank and the inlet 8A of the primary circuit 8 of the heat exchanger 7. Indeed, the outlet 4 of the tank, connectable to the inlet 8A of the primary circuit 8, is arranged in the upper third of the internal volume of the tank 2, and the inlet of the tank 2 connectable to the outlet 8B of the primary circuit 8 is arranged in the lower third of the internal volume of the tank 2, it being understood that the upper third and the lower third are taken by reference to the total height of the internal volume of the enclosure of the tank, this height being taken between the highest point of the interior volume and the lowest point of the internal volume in the state when the tank positioned on the ground, with its face forming the bottom on a horizontal surface.

In practice, the enclosure of the tank has a maximum filling level and the outlet of the tank is generally arranged below this maximum filling level in the upper third of the tank. Conversely, the inlet 3 of tank 2, connectable to the outlet 8B of the primary circuit 8 of the heat exchanger, opens into the tank 2 at a level lower than the level occupied by the part 6 of the heating system housed in the tank 2.

The aim is to extract liquid from the tank at the level of the hot zone of the tank and to reintroduce liquid into the tank at the level of the cold zone of the tank in order to avoid a disturbance of the thermal stratification, which would lead to turbulence generating a loss in volume of the volume of hot liquid that can be used.

The pump 12 that is used for this loop circulation of the liquid between tank and heat exchanger is a pump 12 with a variable flow rate, such as a pump with a "brushless" motor. The presence of the valve 31 and the adjustment of the flow rate of the pump make it possible to comply with the temperature setpoint of the domestic hot water that is to be distributed. This temperature setpoint is predefined.

In practice, the device 1 comprises a clock 171 whose data can be sent to the control unit 17. For its part, the control unit 17 is configured to control the actuation of the drive member 32 for moving the valve 31, that is to say the drive motor for moving the valve 31, in the sense of opening of the valve 31 in parallel with the control of the start-up of the pump 12. The control unit 17 is further configured to control the actuation of the drive member 32 for moving the valve 31 in the sense of closing the valve 31 as a function of the data supplied by the clock 171. In particular, the control unit 17 is further configured to control the actuation of the drive member 32 for moving the valve 31 in the sense of closing the valve 31 in the stopped state of the pump 12, after the pump 12 has been stopped for a predetermined period of time. This predetermined period of time, which can be fixed or variable, is generally of the order of a few minutes.

To control the passage from the on state to the off state of the pump 12 or vice versa with the aid of the control unit 17, the device 1 comprises means 13 for regulating the flow rate of said pump 12. These means 13 for regulating the flow rate of the pump 12 comprise a flowmeter 14 preferably arranged at the inlet of the secondary circuit 9, and at least two temperature probes 131 and 132, of which at least one, shown at 132 in the figures, is arranged on the loop circulation circuit 11 between the tank 2 and the primary circuit 8 of the heat exchanger 7. The control unit 17 is configured to control the pump 12, and therefore of course the valve 31, at least according to the data provided by the temperature probes 131 and 132 and the flowmeter 14. One of the temperature probes, shown at 131 in the figures, is arranged at the inlet of the secondary circuit 9. Other temperature probes, such as a probe arranged at the outlet of the secondary circuit 9, can also be provided.

At the inlet of the secondary circuit 9 in the zone of connection of the inlet 9A of the secondary circuit 9 to the domestic cold water network, the device 1 comprises a duct 18 arranged at least partially in the thickness of the tank 2. In particular, this duct 18 is here partially embedded in the insulator 53 of the tank 2.

The end of the duct 18 opposite the one connected to the inlet 9A of the secondary circuit 9 of the heat exchanger is divided into two branches, one connectable to the domestic cold water circuit and shown at 18B in the figures, the other, shown at 18A in the figures, connectable to a hot water circuit in order to permit immediate distribution of hot water at the outlet of the heat exchanger.

The branch 18B is equipped with the flowmeter 14, which forms one of the means for regulating the pump 12. The other branch 18A of the duct 18 is equipped with a closure member 20, such as a solenoid valve.

A temperature probe 131 is arranged on the duct 18, downstream of the zone of interconnection of the branches 18A and 18B, between this connection zone and the inlet 9A of the secondary circuit of the heat exchanger. This temperature probe 131 forms the temperature probe arranged at the inlet of the secondary circuit of the heat exchanger and capable of helping to regulate the pump 12.

In the same way, the device 1 comprises, at the outlet 9B of the secondary circuit 9, in the zone of connection of the outlet 9B of the secondary circuit to a hot water distribution network, a duct 19 arranged at least partially in the thickness of the tank 2. In particular, this duct 19 is here partially embedded in the insulator 53 of the tank 2.

A temperature probe can be arranged on this duct 19.

The temperature probe 132 for helping to regulate the pump 12, arranged on the loop circulation circuit 11 between the tank 2 and the primary circuit 8 of the heat exchanger 7, can be arranged in the tank 2, as in the example shown, or at the inlet of the primary circuit 8 on the duct forming the outward branch 11A of the loop circuit between the tank 2 and the heat exchanger 7.

Finally, as has been mentioned above, the device comprises a unit 17 for controlling at least the pump 12 and the valve 31, this control unit being configured to control the pump 12 and therefore the valve 31 at least according to the data supplied by the temperature probes 131, 132 and the flowmeter 14. The flowrate setpoint is given by the member for controlling the opening a water supply point of the building.

This control unit 17 takes the form of an electronic and computer system which comprises, for example, a microprocessor and a working memory. According to a particular aspect, the control unit can take the form of a programmable logic controller. In other words, the functions and steps described can be implemented in the form of a computer program or via hardware components, for example programmable port networks; in particular, the functions and steps operated by the control unit or these modules can be effected by instruction and/or computer sets implemented in a process or controller or can be effected by these dedicated electronic components or by FPGA or ASIC type components. It is also possible to combine computer parts and electronic parts.

When it is specified that the unit or means or modules of said unit are configured to perform a given operation, this means that the unit comprises computer instructions and the corresponding execution means which make it possible to perform said operation and/or that the unit comprises corresponding electronic components.

The regulation of the pump therefore uses at least the following input data:
the domestic cold water inlet temperature in the heat exchanger,
the water inlet temperature of the tank in the heat exchanger,
the domestic hot water temperature setpoint, and
the domestic water flow rate.

The flow rate of the pump is chosen on the basis of these data.

To permit the connection of the duct 18 and of the return branch 11B of the loop circuit 11 to the heat exchanger, the heat exchanger comprises, at its cold part formed by the inlet 9A of the secondary circuit 9 and the outlet 8B of the primary circuit 8, which are arranged side by side on one face of the heat exchanger, a part 27 for connecting said inlet and outlet respectively to the duct 18 and to the return branch 11B.

This connecting part 27, which comprises two duct segments for said connections, forms the support of a drain valve 25 capable of allowing the tank to be emptied via the return branch 11B. This connecting part 27 further ensures the fixing of the heat exchanger 7 on the tank 2 and the fixing of the temperature probes.

Likewise, at its hot part formed by the inlet 8A of the primary circuit and the outlet 9B of the secondary circuit, which are arranged side by side on the same face of the heat exchanger, said heat exchanger 7 comprises a part 26 for connecting said inlet and outlet respectively to the outward branch 11A of the loop circuit and to the duct 19.

This connecting part 26, which comprises two duct segments for said connections, also forms a means of connecting the pump 12. This connecting part also supports some of the temperature probes.

By virtue of this embodiment, at least the heat exchanger, the pump 12, which has a variable flow rate, the valve 31 and its drive member 32, and the means 13 for regulating the flow rate of the pump 12, form a ready-to-install assembly.

To allow the heat exchanger to operate, it is necessary to heat the temperature of the tank to a temperature generally around 70° C. in the upper part of the tank, it being possible for this temperature to be controlled with the aid of a temperature probe 28 positioned as close as possible to the heating system 6, for example in the housing body 23 presented below.

The heating system 6 can take a large number of forms. In the example shown, the tank 2 comprises two electrical resistances, namely an upper electrical resistance and a lower electrical resistance, which are housed inside the tank, and a control unit for said electrical resistances.

The control unit is configured to selectively control said electrical resistances. This control unit is also configured to control the electrical resistances to different temperature setpoints.

This control unit can be implemented in common with the control unit 17 of the pump and is formed in the same way as the one described for the control unit of the pump of an electronic and computer system which comprises, for example, a microprocessor and a working memory.

The setpoint temperature of the lower electrical resistance is less than or equal to the setpoint temperature of the upper electrical resistance. The upper electrical resistance has priority.

Figure 9:
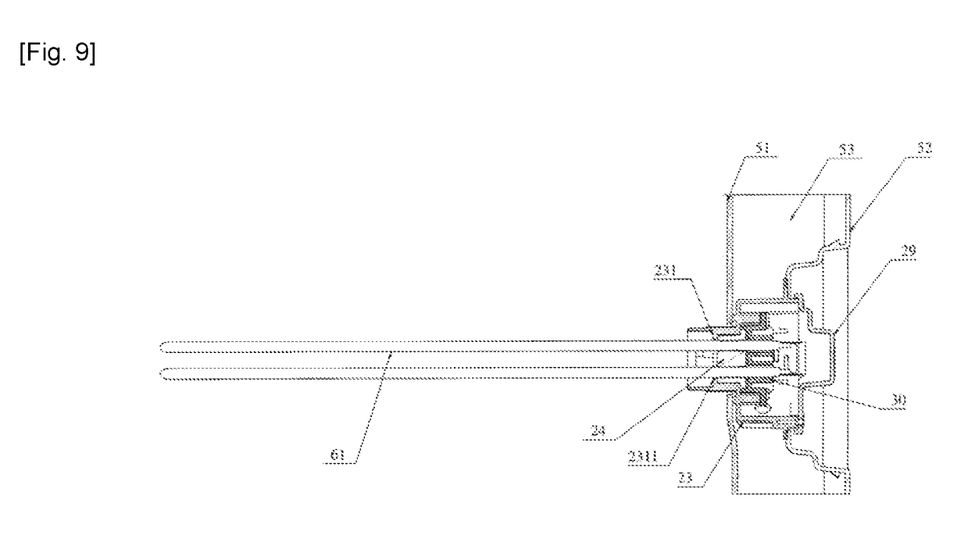
FIG. 9 shows a sectional view of an electrical resistance in the state when inserted in the tank.
Figure 10:
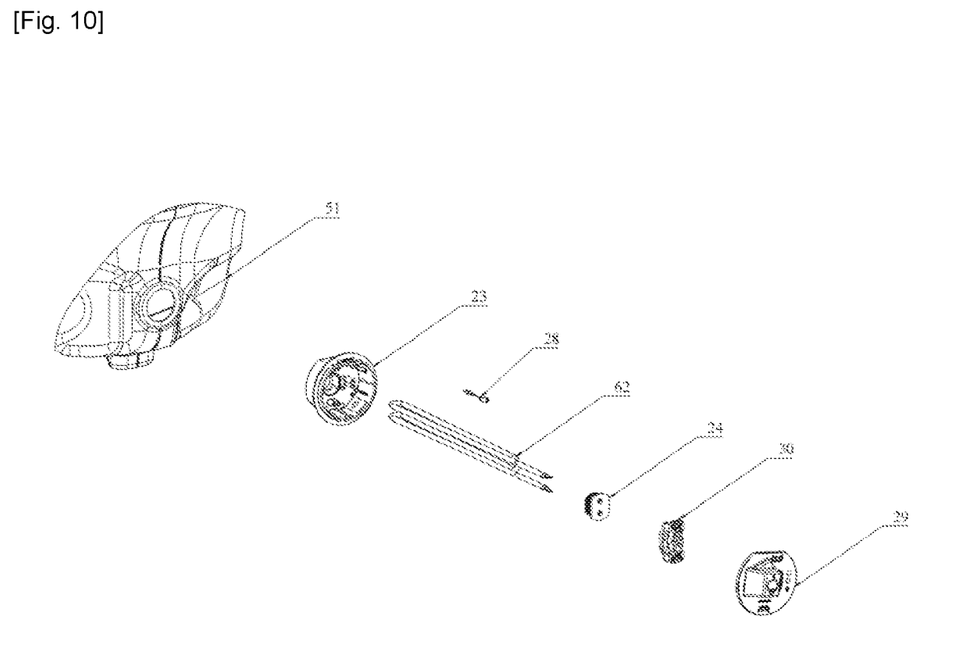
FIG. 10 shows a perspective and exploded view of the elements of an electrical resistance suitable for being inserted into the tank.

To permit simplified assembly of each electrical resistance, the tank 2 comprises, at the level of each of the electrical resistances, two mutually opposite orifices 21, 22, one 21 formed in the enclosure 51, the other 22 formed in the casing 52, these orifices 21, 22 being connected by a housing body 23 with a drilled bottom 231 forming an interconnecting sleeve for said orifices 21, 22. This housing body 23, made of synthetic material, has its bottom resting on the enclosure 51, extending at least partially inside the enclosure 51. In particular, the bore in the bottom of the housing is bordered on the outside by a rim in order to form a tubular projection inserted into the orifice of the enclosure. The tubular projection of the housing body inserted into the orifice of the enclosure comprises two thermowells open toward the interior of the housing body, each thermowell being formed integrally with the housing body. A temperature probe can be positioned inside one of the thermowells, and a cut-out thermostat can be positioned inside the other of the thermowells. Each electrical resistance 61, 62 is in the form of an elongate body provided with a seal 24 engaged on the body of the resistance. This electrical resistance 61 or 62 is slidably introduced inside the housing body 23 and passes through the bore 2311 in the bottom 231 of the housing body 23 in order to extend at least partially inside the tank 2. In particular, this electrical resistance 61 or 62 can be positioned inside the housing body coaxially with the bore 2311 in the bottom of the housing body in order to protrude via said bore into the enclosure, and it is slidably movable inside the housing body. In the positioned state of the electrical resistance 61 or 62 projecting at least partially inside the tank 2, and in the state with the electrical resistance 61 or 62 passing through the bore 2311, the seal 24 in leaktight contact with the resistance 61 or 62 sealingly closes the bore 2311 in the bottom 231 of the housing body 23. A part 30 can also be engaged on the body of the resistance in order to cover the seal 24. This part 30 is fixed by screwing the housing body in order to prevent any untimely exit of the seal 24. This fixing part can thus be engaged on the electrical resistance following the seal and can be coupled by screwing to the housing body, this housing body comprising at least one screw well formed integrally with said body.

The housing body 23 is closed by a cover 29 which conceals the resistance and which can be removed from the tank by a simple pull exerted on the electrical resistance. This cover is housed in a casing reinforcement formed at the orifice of the casing.

It is noted in the examples shown that the housing body comprises a bottom and a peripheral side wall and that the peripheral side wall of the housing body is provided with an outer peripheral flange arranged bearing on the part of the internal surface of the casing surrounding the orifice of the casing.

As a variant, the tank can comprise only an electrical resistance.

Each resistance is a hairpin electrical resistance comprising a tubular body inside which is housed a resistive wire and at least one hot melt, the ends of the pin made in the form of two parallel branches, each being provided with an electrical connector on which the seal is able to engage.

Figure 4:
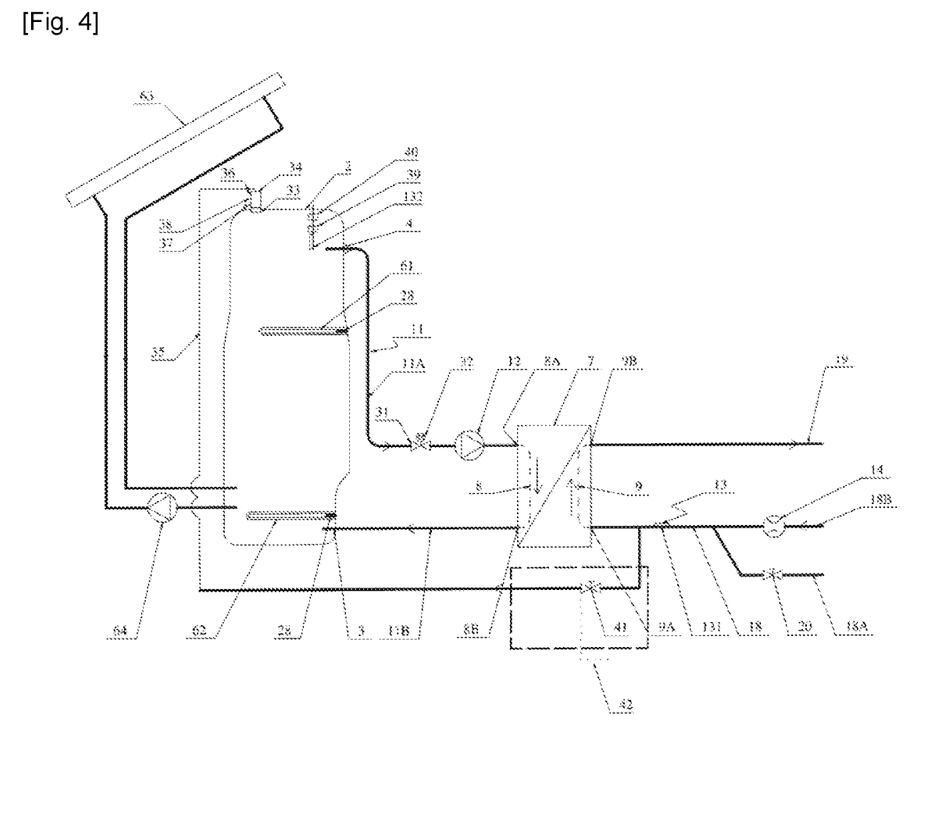
FIG. 4 shows a diagram of the operation of the device for producing hot water.
Figure 5:
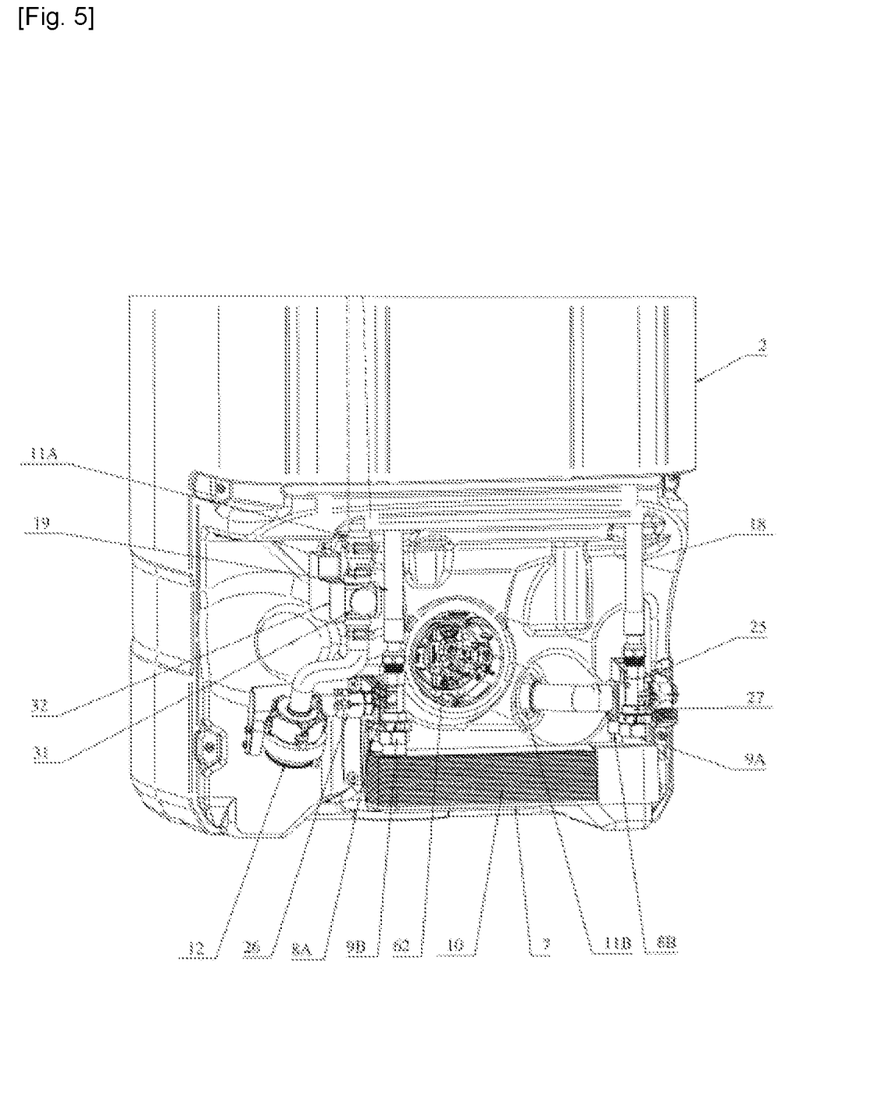
FIG. 5 shows a partial perspective view of the lower part of the device in the state of removal of the cover closing the compartment formed by a reservation made in the tank, this compartment serving to house the heat exchanger.
Figure 6:
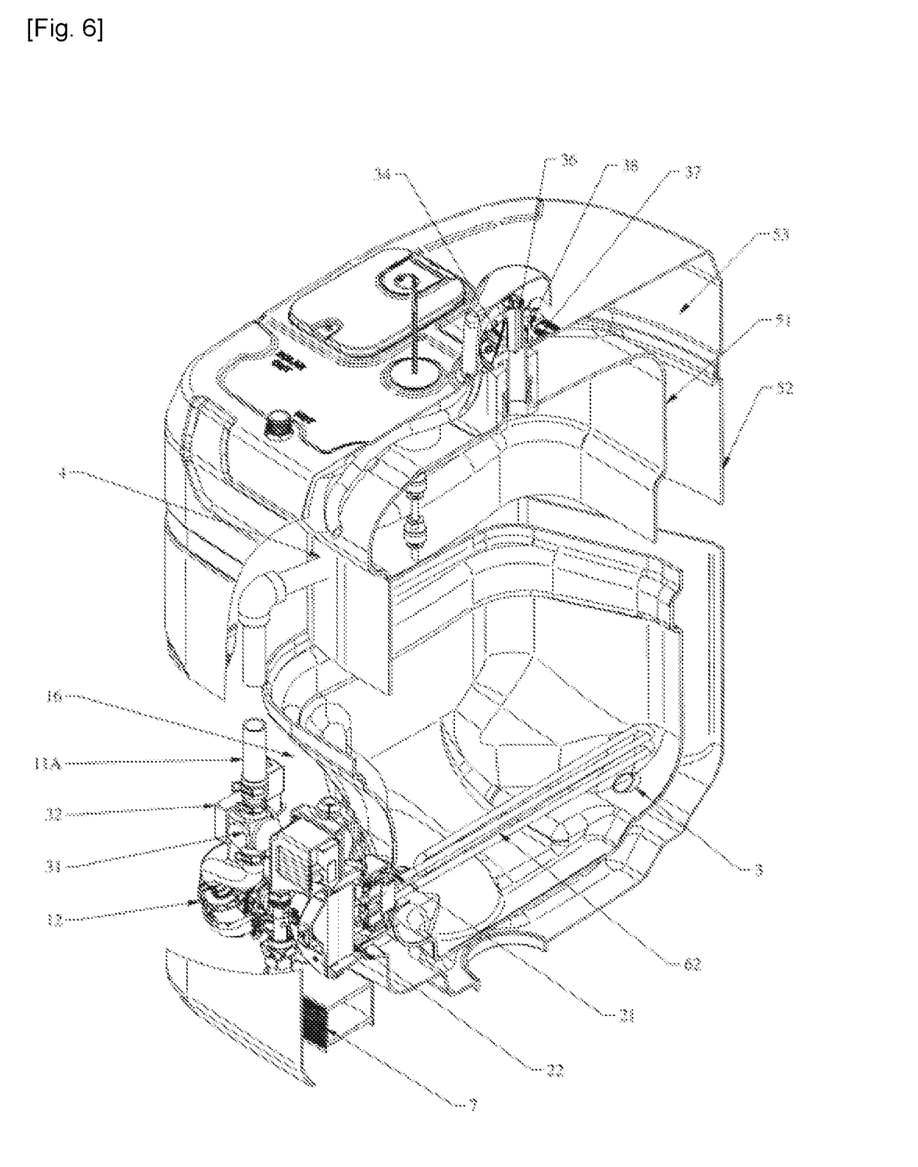
FIG. 6 shows a partial schematic view of the device, partially in longitudinal section.
Figure 7:
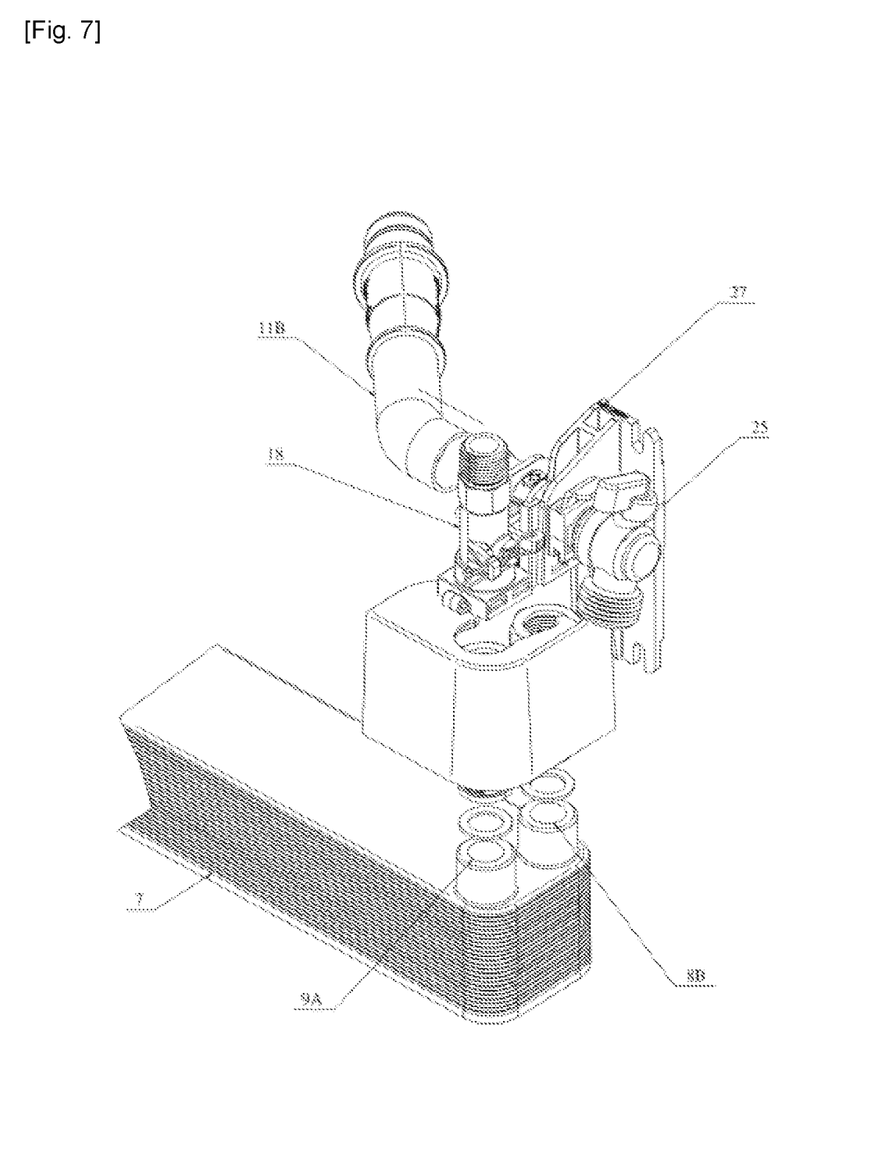
FIG. 7 shows a perspective and exploded view of the elements of the connection means provided on the cold part of the heat exchanger.
Figure 8:
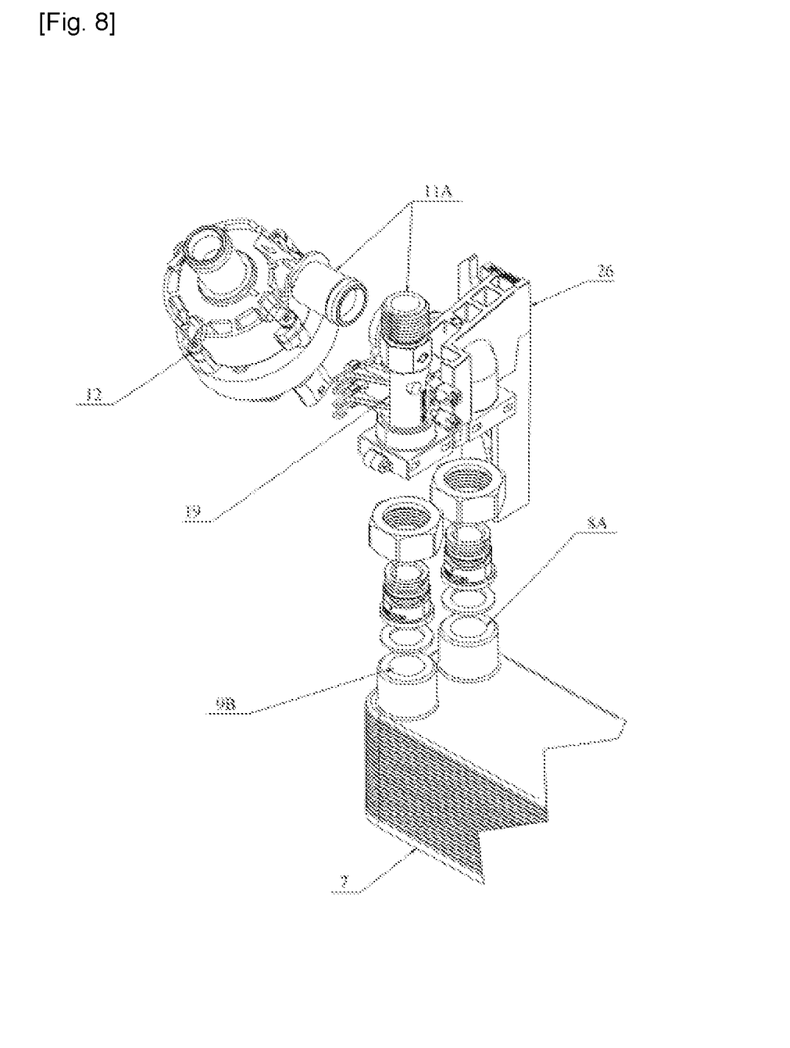
FIG. 8 shows a perspective and exploded view of the elements of the connection means provided on the hot part of the heat exchanger.

In addition, the heating means can comprise a heat pump and a loop circulation circuit between the contents of the tank and the heat pump. The heating system can also comprise, in addition or as a variant, a solar collector 63 and means 64 for circulating the contents of the tank through said solar collector 63, as is shown in FIG. 4. The heating system can also comprise a boiler, for example a gas boiler, connected to the tank.

Finally, to permit filling of the tank in particular during the first use of the device for producing hot water, or in the event of evaporation of the liquid contained in the tank 2, the tank 2 is equipped, in its upper third, with an orifice 33 for filling the tank 2 with liquid. This filling orifice 33 is connected by a closable fluidic connection 35 to the portion of the secondary circuit 9 extending between the inlet 9A of the secondary circuit 9 and the zone 10 for heat exchange between the primary 8 and secondary 9 circuits of the heat exchanger 2. At the filling orifice 33, this closable fluidic connection 35 is provided with a part 34 for connection to the tank 2. This connection part 34 is provided with a vent 36, an overflow orifice 37, and an additional orifice 38 acting as an overflow or a vent depending on the filling level of the tank 2. The additional orifice 38 is arranged at a higher level with respect to the overflow orifice 37. This additional orifice 38 is also arranged at a level lower than that occupied by the vent 36. The configuration of this connection part makes it possible to prevent any rise of "dead" water from the tank 2 into the distribution network of the filling liquid during the operation of filling the tank.

This part 34 for connection to the tank 2 is also equipped with a closure member 43. In the example shown, this closure member 46 is a pivoting valve mounted pivotably around what is called a horizontal axis extending perpendicularly to the longitudinal axis of the connection part 34, which is a tubular part. This closure member 43, which is normally closed, is thus able to pass from the closed position to the open position under the effect, for example, of filling of the tank. The presence of such a closure member makes it possible to limit the appearance of condensation at the cover 54 of the casing, in particular the part of the cover 54 labeled 44 in the figures and at least partially covering the connection part 34.

To perfect the safety of the installation and to limit the risk of untimely filling of the tank 2, the tank 2 is equipped with a lower level sensor 39 and an upper level sensor 40, which are arranged at different heights in the tank 2. In the examples shown, these sensors are floats that are axially offset along a rod inside the tank 2. The closable fluidic connection 35 is provided with a closure member 41, such as a solenoid valve. This closure member 41 is equipped with an electrical control circuit 42. The electrical control circuit 42 is configured to pass from the closed state, corresponding to the open position of the closure member 41, to the open state, corresponding to the closed position of the closure member 41 at least at the activated state of the upper level sensor 40. Thus, when the filling level of the tank 2 reaches the upper level sensor 40, that is to say in the activated state of the upper level sensor 40, the latter acts as a switch of the electrical control circuit 42 of the closure member 41 and switches the latter in order to open it. Thus, further filling of the tank 2 from the fluidic connection is prevented.

The device operates as follows:

When a draw-off is detected, this detection being effected with the aid of the flowmeter, temperature data measured by the various temperature probes arranged at the inlet and/or outlet of the primary and secondary circuits, and also the flow rate value measured, are sent to the control unit 17 which opens the valve 31 and regulates the flow rate of the pump 12 as a function of said data in order to allow heating of the domestic cold water to the predetermined setpoint temperature.

At the end of the draw-off, the pump 12 is stopped and the heat exchanger 7 is emptied by thermosiphon in order to prevent any stagnation of hot water inside the heat exchanger. After a predetermined period of time, the valve 31 is closed in order to prevent any further flow of fluid. Indeed, outside a period of drawing-off of domestic hot water, the pump is stopped. When the pump stops, the cold water contained in the bottom of the tank pushes the lukewarm water from the exchanger, which rises into the tank via the outward branch of the loop circuit 11 between the tank and the heat exchanger, until the level of separation between cold water and hot water at the level of the cold water in the tank and in the water pipe of the outward branch of the loop circuit is the same.

Thus, the lukewarm water from the exchanger is replaced by the cold water from the bottom of the tank by a thermosiphon phenomenon.

Figure 1:
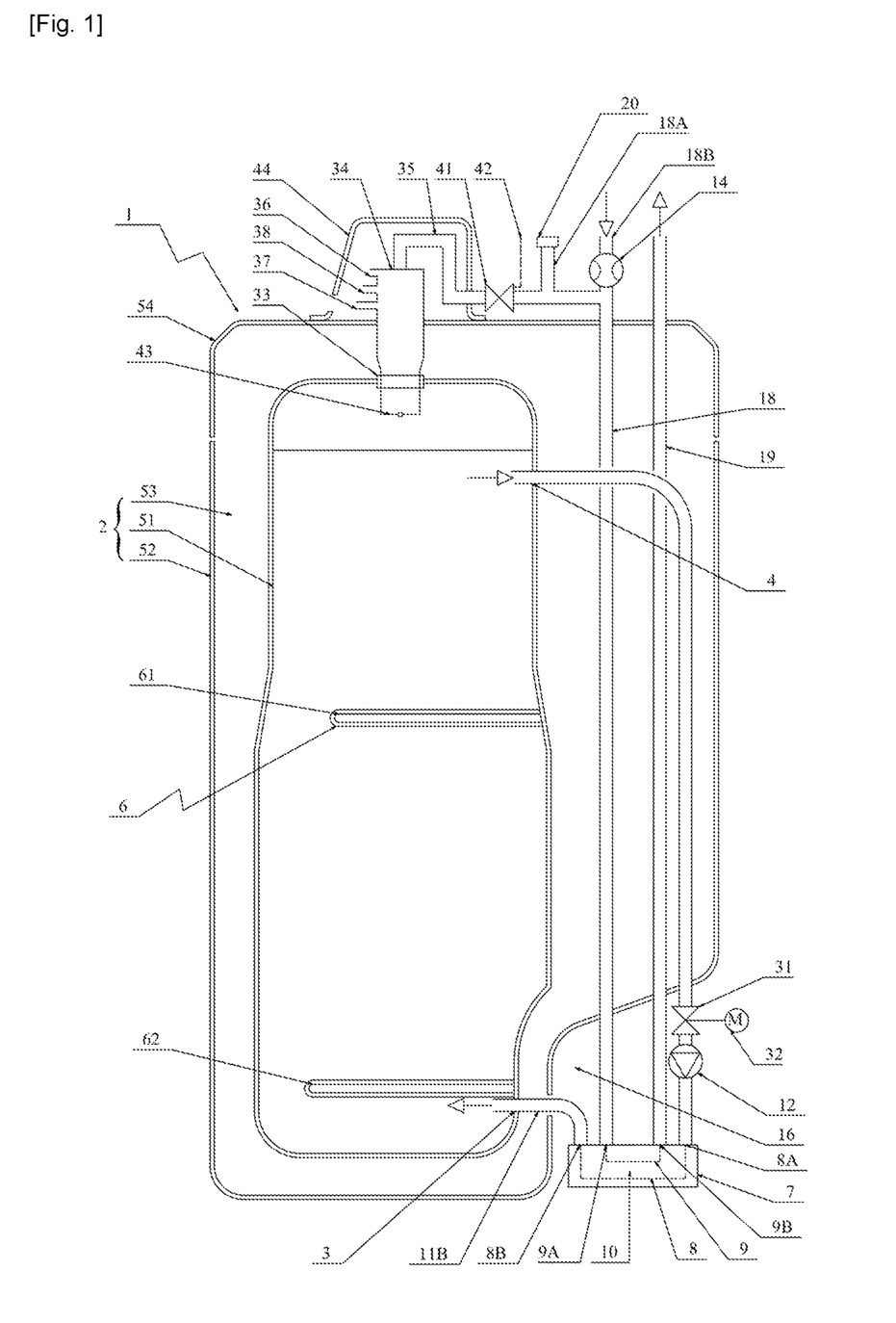
FIG. 1 shows a schematic view of a device for producing domestic hot water, in a configuration in which the pump is operating.
Figure 2:
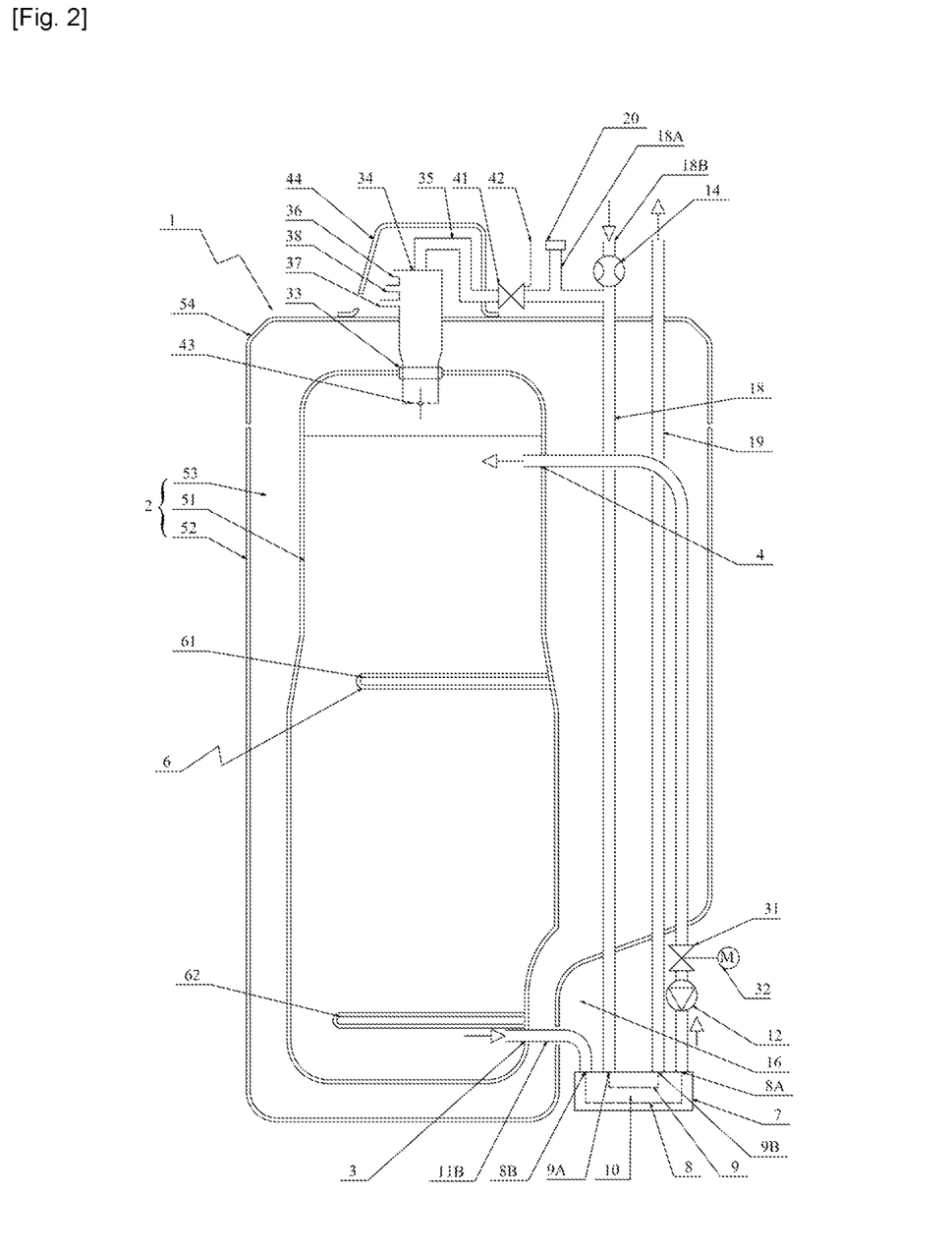
FIG. 2 shows a schematic view of a device for producing domestic hot water, in a configuration in which the pump is not operating, in order to illustrate the emptying of the heat exchanger by thermosiphon.
Figure 3:
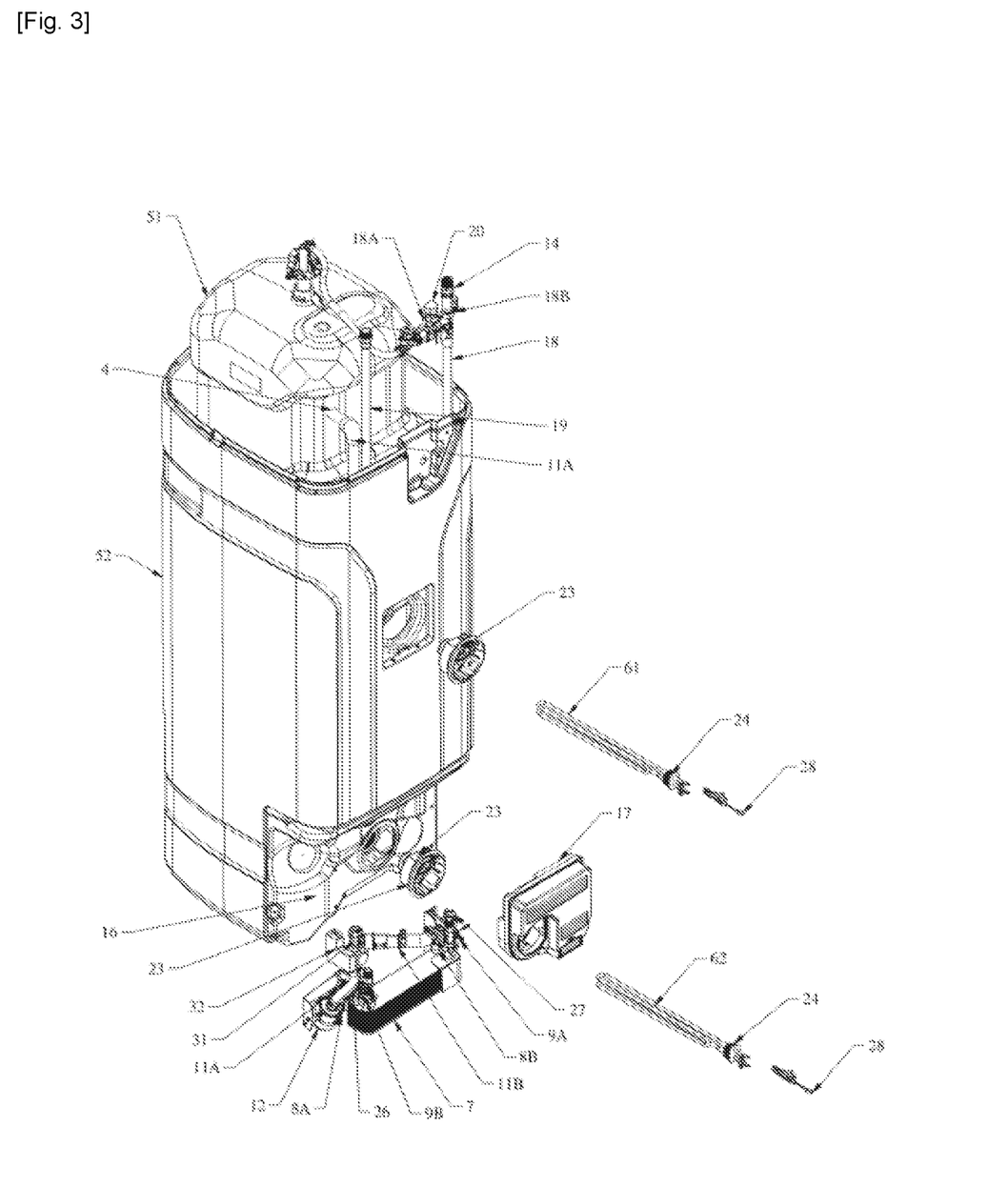
FIG. 3 shows a perspective and exploded view of the constituent elements of a device for producing hot water.

This circulation in reverse is shown in FIG. 2. This reverse circulation is prevented once the valve 31 is closed, this closing of the valve 31 occurring a few minutes after the pump 12 is stopped, once the cooling of the heat exchanger is completed.

The invention claimed is:

1. A device for producing hot fluid, comprising:
a tank for receiving liquid, equipped with at least one fluid inlet and one fluid outlet, at least the part of the tank called the inner part, suitable for being in contact with the liquid filling the tank, being made of synthetic material,
a system for heating the contents of the tank,
a heat exchanger comprising a primary circuit equipped at least with a fluid inlet and a fluid outlet, a secondary circuit equipped at least with a fluid inlet and a fluid outlet, and a zone, for heat exchange between the primary and secondary circuits, which is arranged outside the tank,
a loop circulation circuit between the tank and the primary circuit of the heat exchanger, and
a pump arranged on the loop circulation circuit, the inlet of the secondary circuit of the heat exchanger being connectable at least to a source of fluid to be heated, in order to allow the production of hot fluid at the outlet of the secondary circuit,
wherein the device comprises a valve arranged on the loop circulation circuit between the tank and the primary circuit of the heat exchanger, a drive member for moving the valve between an open position and a closed position, a unit for controlling at least the pump and the drive member for moving the valve, the control unit being configured to control the actuation of the drive member for moving the valve and thus the passage of the valve from the open position to the closed position, or vice versa, depending on the on/off state of the pump, and
wherein the tank comprises, in the lower half of the tank, on the outer surface of the tank, a reservation inside which the heat exchanger, which is a counter-current exchanger, with plates, is able to be housed in order to extend at least partially within the overall contour of the tank.

2. The device as claimed in claim 1, wherein the device comprises a clock, and in that the control unit is configured to control the actuation of the drive member for moving the valve in the sense of opening the valve in parallel with the control of the start-up of the pump and is configured to control the actuation of the drive member for moving the valve in the sense of closing the valve in the stopped state of the pump, after the pump has been stopped for a predetermined period of time.

3. The device as claimed in claim 1, wherein the pump is a pump with a variable flow rate, in that the device comprises means for regulating the flow rate of said pump, these means for regulating the flow rate of the pump comprising a flowmeter arranged at the inlet of the secondary circuit, and at least two temperature probes, at least one of which is arranged on the loop circulation circuit between the tank and the primary circuit of the heat exchanger, and in that the control unit is configured to control the pump at least according to the data supplied by the temperature probes and the flowmeter.

4. The device as claimed in claim 3, wherein the device comprises, at the inlet of the secondary circuit, in the zone of connection of the inlet of the secondary circuit to at least one source of fluid to be heated, a duct arranged at least partially in the thickness of the tank, this duct, called the inlet duct, being able to be coupled at one end to the inlet of the secondary circuit of the heat exchanger and dividing, at the end opposite the connection to at least one source of fluid to be heated, into two branches, which are equipped one with a closure member and the other with the flowmeter.

5. The device as claimed in claim 1, wherein the loop circulation circuit between the tank and the primary circuit of the heat exchanger comprises an outward branch arranged between the outlet of the tank and the inlet of the primary circuit, and a return branch arranged between the outlet of the primary circuit and the inlet of the tank, the pump and the valve being arranged on the outward branch of the loop circulation circuit.

6. The device as claimed in claim 1, wherein the tank is equipped with an orifice for filling the tank with liquid, this filling orifice being connected by a closable fluidic connection to the portion of the secondary circuit extending between the inlet of the secondary circuit and the zone for heat exchange between the primary and secondary circuits of the heat exchanger.

7. The device as claimed in claim 6, wherein the closable fluidic connection is provided, at the level of the filling orifice, with a part for connection to the tank, this connection part being provided with a vent, an overflow orifice, and an additional orifice acting as an overflow or vent depending on the filling level of the tank.

8. The device as claimed in claim 6, wherein the tank is equipped with a lower level sensor and an upper level sensor, which are arranged at different heights in the tank, in that the closable fluidic connection is provided with a closure member equipped with an electrical control circuit, and in that the electrical control circuit is configured to pass from the closed state, corresponding to the open position of the closure member, to the open state, corresponding to the closed position of the closure member at least in the activated state of the upper level sensor.

9. The device as claimed in claim 1, wherein the outlet of the tank, connectable to the inlet of the primary circuit, is arranged in the upper third of the internal volume of the tank, and the inlet of the tank, connectable to the outlet of the primary circuit, is arranged in the lower third of the internal volume of the tank, in that at least part of the heating system is housed in the tank, and in that the inlet of the tank, connectable to the outlet of the primary circuit of the heat exchanger, opens into the tank at a level lower than the level occupied by the part of the heating system housed in the tank.

10. The device as claimed in claim 1, wherein the heat exchanger, when connected to the tank, is arranged at a level lower than the level occupied by the inlet of the tank connectable to the outlet of the primary circuit of said heat exchanger.

11. The device as claimed in claim 1, wherein the tank comprises an enclosure, a casing at least partially surrounding the enclosure, and an insulator arranged between the enclosure and the casing.

12. The device as claimed in claim 11, wherein at least part of the heating system is housed in the tank, and in that the thickness of the tank, taken between the outer face of the casing and the inner face of the enclosure, is, in the part of the tank extending above the part of the heating system housed inside the tank, at least locally greater than the thickness of the tank extending below the part of the heating system housed inside the tank.

13. The device as claimed in claim 1, wherein at least the heat exchanger, the pump, which has a variable flow rate, and the valve, with its drive member for moving it, which is a motor, form a ready-to-install assembly.

14. The device as claimed in claim 1, wherein
the tank comprises an enclosure, a casing at least partially surrounding the enclosure, and an insulator arranged between the enclosure and the casing, and
wherein the heating system comprises at least one electrical resistance housed inside the tank, in that the tank comprises, at the level of the, or at least one of the, electrical resistance(s), two mutually opposite orifices formed one in the enclosure and the other in the casing, these orifices being connected by a housing body with a drilled bottom forming a connecting sleeve between said orifices, this housing body extending at least partially inside the enclosure, and in that the electrical resistance is in the form of an elongate body provided with a seal engaged on the electrical resistance, this seal, in leaktight contact with the electrical resistance, sealingly closing the bore in the bottom of the housing body in the state with the electrical resistance extending through said bore.

\* \* \* \* \*